US008036608B2

(12) United States Patent
Holm

(10) Patent No.: US 8,036,608 B2
(45) Date of Patent: Oct. 11, 2011

(54) APPARATUS AND METHOD PROVIDING PUSH TO TALK OVER CELLULAR (POC) DYNAMIC SERVICE OPTIONS

(75) Inventor: Jan Holm, Örbyhus (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 594 days.

(21) Appl. No.: 11/575,450

(22) PCT Filed: Sep. 21, 2004

(86) PCT No.: PCT/IB2004/003075
§ 371 (c)(1),
(2), (4) Date: Jul. 13, 2007

(87) PCT Pub. No.: WO2006/032940
PCT Pub. Date: Mar. 30, 2006

(65) Prior Publication Data
US 2007/0281681 A1    Dec. 6, 2007

(51) Int. Cl.
H04B 1/38 (2006.01)
H04B 7/00 (2006.01)
(52) U.S. Cl. ............................... 455/90.2; 455/518
(58) Field of Classification Search .................. None
See application file for complete search history.

(56) References Cited

U.S. PATENT DOCUMENTS

| | | | |
|---|---|---|---|
| 5,991,291 A | 11/1999 | Asai et al. | |
| 2002/0072368 A1 | 6/2002 | Sawada et al. | |
| 2003/0149774 A1* | 8/2003 | McConnell et al. | 709/227 |
| 2004/0111476 A1* | 6/2004 | Trossen et al. | 709/206 |
| 2004/0122896 A1* | 6/2004 | Gourraud | 709/204 |
| 2004/0131060 A1* | 7/2004 | Newberg et al. | 370/390 |
| 2004/0224710 A1* | 11/2004 | Koskelainen et al. | 455/518 |
| 2005/0083904 A1* | 4/2005 | Khartabil et al. | 370/351 |
| 2005/0122922 A1* | 6/2005 | Wu et al. | 370/310 |
| 2005/0122937 A1* | 6/2005 | Hart et al. | 370/335 |
| 2005/0254510 A1* | 11/2005 | Oja et al. | 370/431 |
| 2005/0255811 A1* | 11/2005 | Allen et al. | 455/78 |
| 2005/0259675 A1* | 11/2005 | Tuohino et al. | 370/426 |
| 2006/0046758 A1* | 3/2006 | Emami-Nouri et al. | 455/518 |
| 2008/0096597 A1* | 4/2008 | Vempati et al. | 455/518 |

FOREIGN PATENT DOCUMENTS

WO     WO 2004/028113 A1     4/2004

OTHER PUBLICATIONS

Comneon, Ericsson, Motorola, Nokia Siemens: "Push-to-talk over Cellular (PoC); Architecture; PoC Release 2.0" Internet Article, Jun. 22, 2004, p. 1-49 XP002324386.

(Continued)

*Primary Examiner* — Yuwen Pan
*Assistant Examiner* — Ayodeji Ayotunde

(57) ABSTRACT

An apparatus and method for providing dynamic Push To over Cellular, PoC, service options in a wireless communication network. Service options and terminal capabilities for PoC Clients (11, 15) are stored in the network, preferably in a PoC Server (13). A PoC Client (11) uses a SIP PUBLISH message (17) to set the actual status of the answering mode and any barring service, and, if automatic answering mode is set, also stores a list of codecs that the PoC Client (11) supports. When the PcC Client is called, the calling PoC Client (15) informs the Server (13) of supported codecs, and the Server selects a codec supported by both Clients, thus optimizing the connection.

15 Claims, 2 Drawing Sheets

OTHER PUBLICATIONS

Ericsson, Motorola, Nokia Siemens: "Push-to-talk over Cellular (PoC) User Plane;Transport Protocols; PoC Release 1.0" Technical Specification Oct. 31, 2003, pp. 1-37 XP002321969.

Niemi, A. Session Initiation Protocol (SIP) Extension for Event State Publication. SIP WG Internet-Draft. Sep. 9, 2003. Retrieved online at: http://tools.ietf.org/id/draft-ietf-sip-publish-00.txt.

* cited by examiner

APPARATUS AND METHOD PROVIDING PUSH TO TALK OVER CELLULAR (POC) DYNAMIC SERVICE OPTIONS

TECHNICAL FIELD OF THE INVENTION

The present invention relates generally to communication networks, and in particular, to an apparatus and method for providing dynamic Push To Talk over Cellular (PoC) service options in wireless communication networks.

DESCRIPTION OF RELATED ART

Push To Talk over Cellular (PoC) is a fast-connect, half-duplex service of the type generally known as Push-to-Talk (PTT) or voice chat services. PTT applications provide wireless users with a virtually instantaneous method of connecting to other users, with just the touch of a button on their handset. The service is half-duplex and can be used for one-to-one private calls as well as one-to-many group calls. Users can take advantage of private, direct, simultaneous radio voice connection over very wide areas, affordably and conveniently, often replacing other devices such as pagers and two-way radios. Users receiving the call hear the caller's voice automatically without having to answer the call.

PoC is the official name used in the open specifications currently being developed by the Open Mobile Alliance (OMA) for this service. The PoC specifications utilize a number of existing specifications from the Internet Engineering Task Force (IETF), the Third Generation Partnership Project (3GPP), and 3GPP2 including the capabilities of the 3GPP IP Multimedia Subsystem (IMS) and the 3GPP2 Multimedia Domain (MMD) to enable IP connectivity between mobile devices. In one solution, PoC uses a server, which is independent of the existing radio and core networks. PoC may be implemented on the IP backbone over radio technologies such as WCDMA, CDMA2000, GPRS, UMTS, and 802.11.

The use of IMS and MMD adds the ability to integrate voice and data services over IP-based packet-switched networks. Two fundamental capabilities are added on top of the packet-switched domain. First is the ability to find a user via the Session Initiation Protocol (SIP) to initiate a session. Second is the ability to integrate new services such as PTT. By introducing IMS and its multiple service-delivery capability, a common infrastructure for services is established, and the requirement to build a service delivery infrastructure for each service is eliminated.

The existing PoC standard defines two barring service options and an answering mode service option requiring configuration in the network:

Incoming Session Barring for PoC Communication;
  Incoming Session Barring for PoC Alert; and
  Answering Mode (automatic or manual answering mode).

These options are very dynamic, and traditional management cannot be used.

The existing PoC standard also defines the following terminal capabilities requiring configuration in the network:

Supported codecs for encoding voice signals; and
  Supported codecs for decoding voice signals.

The existing PoC standard specifies some dynamic service options, but there is no solution for configuring dynamic PoC-related features and capabilities in the network. The answering mode, for example, can be set to automatic or manual mode. If the answering mode is set to manual, call establishment is the same as a normal SIP call. However, if the answering mode is set to automatic, the network allows the calling PoC user to start speaking at the same time as the called user is invited. The SIP protocol requires that the network then return the codec for use with the call. This creates a problem for the network because the codec selected for the call may not be supported by the called user. In this case, the network must perform transcoding between the calling PoC user and the called PoC user. The transcoding of audio, compressed with codecs used by PoC terminals, will produce poor sound quality.

One solution to this problem is to always use the same codec (i.e., a default codec). However, this may also be a problem since each PoC terminal may be connected via different access technologies with different views on which default codec to use, and with different views on available bandwidth.

Accordingly, there is a need for an improved apparatus and method for providing dynamic PoC service options.

SUMMARY OF THE INVENTION

The present invention provides a solution in which service options and terminal capabilities for PoC Clients are stored in the network. The service options and terminal capabilities may be stored in the PoC Server or in a server close to the PoC server. In a preferred embodiment, a PoC Client uses the SIP PUBLISH method to set the actual status of the answering mode and any barring service, and, if automatic answering mode is set, also stores a list of codecs that the PoC Client supports. By telling the network which codecs the PoC Client supports, the network can then make a more intelligent selection of the codec in the automatic answer case, and can also utilize better codecs when the access technology allows. The service options may be retrieved by the PoC Server or any other service that requires knowledge about the present service option and terminal capabilities settings.

Thus in one aspect, the present invention is directed to a method of providing dynamic PoC service options. The method includes the steps of storing service options of a calling PoC client and a called PoC client in a server; retrieving the stored service options during establishment of a data/audio session between the calling PoC client and the called PoC client; and utilizing the retrieved service options to optimize the session.

In another aspect, the present invention is directed to a method of providing dynamic PoC service options that includes the steps of storing in a server, an indication of whether an answering mode of a called PoC client is set to automatic or manual, and an indication of which codecs are supported by the called PoC client for decoding encoded voice signals; and receiving in the server, a request from a calling PoC client to establish a session with the called PoC client. The request includes an indication of which codecs are supported by the calling PoC client for encoding voice signals. If the answering mode of the called PoC client is set to automatic, the server selects a codec that is supported by both the calling PoC client and the called PoC client, and notifies the calling PoC client and the called PoC client of the codec selected for use during the session.

In yet another aspect, the present invention is directed to an apparatus for providing dynamic PoC service options. The apparatus includes a database for storing an indication of whether an answering mode of a called PoC client is set to automatic or manual, and an indication of which codecs are supported by the called PoC client for decoding encoded voice signals; means for receiving a request message from a calling PoC client to establish a session with the called PoC client; and a codec selector for selecting a codec that is supported by both the calling PoC client and the called PoC client. The apparatus also includes means responsive to receiving the request message, for retrieving from the database, the indication of the answering mode of the called PoC client, and the indication of which codecs are supported by the called PoC client. If the answering mode is automatic, the indication of which codecs are supported by the called PoC client is sent to the codec selector. The apparatus also includes means responsive to an indication that the answering mode of the called PoC client is set to automatic, for extracting from the request message, an indication of which codecs are supported by the calling PoC client for encoding voice signals, wherein the indication of which codecs are supported by the calling PoC client is sent to the codec selector; and means for notifying the calling PoC client and the called PoC client of the codec selected for use during the session.

DETAILED DESCRIPTION OF EMBODIMENTS

Figure 1:
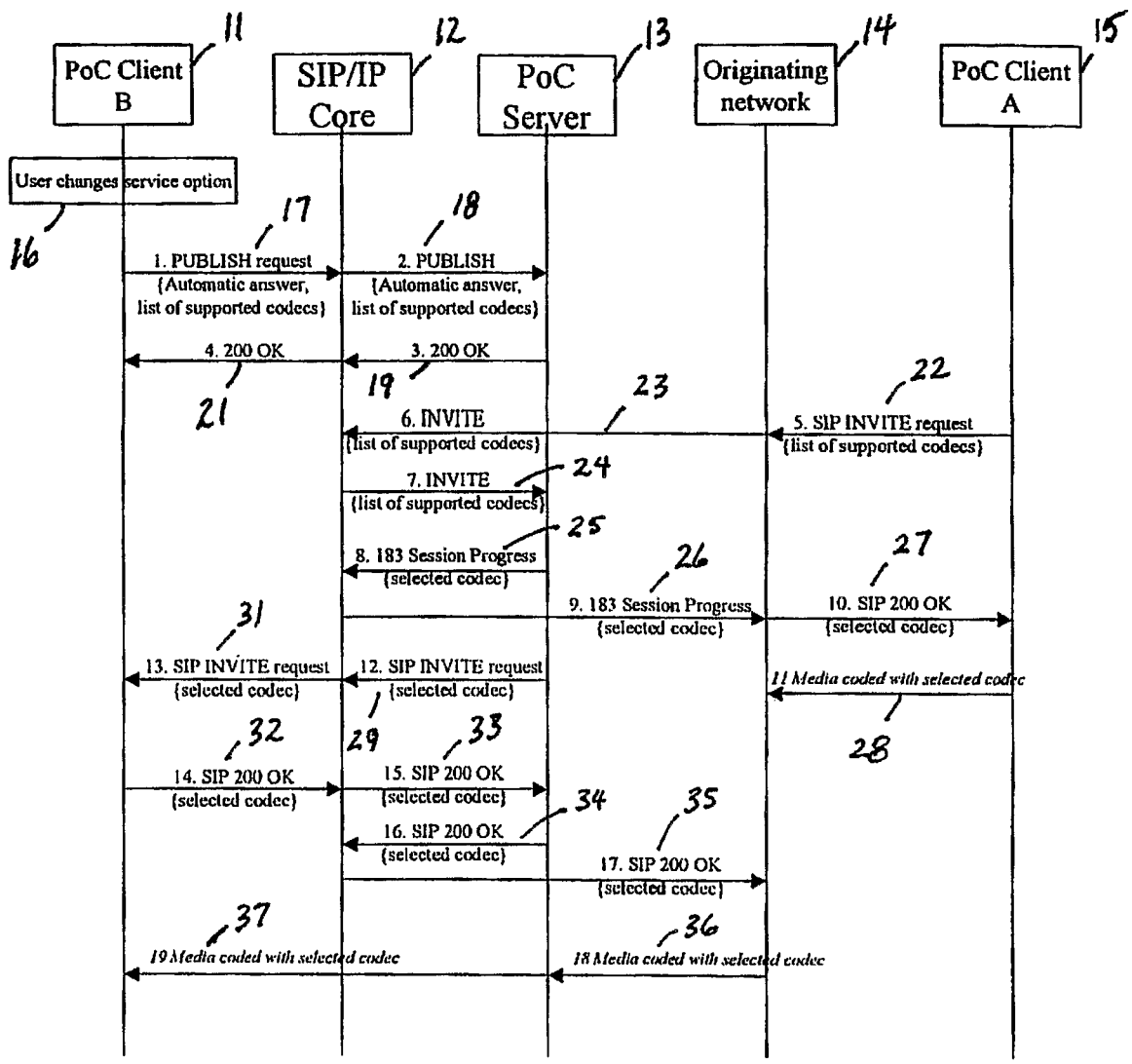
FIG. 1 is a signaling diagram illustrating an embodiment of the method of the present invention.

FIG. 1 is a signaling diagram illustrating an exemplary embodiment of the method of the present invention. Illustrated are a called client (PoC Client B) 11, a SIP/IP core network 12, a PoC server 13, an originating network 14, and a calling client (PoC Client A) 15. At step 16, the user of PoC Client B changes a service option such as Incoming Session Barring for PoC Communication, Incoming Session Barring for PoC Alert, or Answering Mode (automatic or manual). For example, the PoC Client B may change its answering mode to automatic.

The PoC Client B 11 then uses the PUBLISH method to set service options and terminal capabilities in the network. The PoC Client B sends a PUBLISH request message 17 to the SIP/IP Core 12 and includes, in this example, an indication that the answering mode is set to automatic, and an indication of the types of codecs supported by the PoC Client B. At step 18, the PUBLISH request message is forwarded to the PoC Server 13. Since the answering mode is set to automatic, the codecs supported by PoC Client B are also uploaded to the PoC Server. The PoC Server then returns a SIP 200 OK message 19 to the SIP/IP Core, which forwards the message at step 21 to the PoC Client B.

At that point in the example, PoC Client A 15 invites the PoC Client B 11 to a call. This is done by PoC Client A sending a SIP INVITE message 22 to the originating network 14, which forwards the message at step 23 to the SIP/IP Core 12. The INVITE message includes a list of codecs supported by PoC Client A. The SIP/IP Core, in turn, forwards the INVITE message at step 24 to the PoC Server 13. The PoC Server then selects a codec from the lists of supported codecs received from PoC Client A and PoC Client B. This enables the PoC Server to select a codec and optimize bandwidth efficiency and audio quality with respect to the access technology being utilized by the two clients. The PoC server then includes an indication of the selected codec in a 183 Session Progress message 25, which is sent to the SIP/IP Core. At step 26, the SIP/IP Core forwards the 183 Session Progress message to the originating network, which then sends a SIP 200 OK message 27 with an indication of the selected codec to the PoC Client A.

Establishment of the session then proceeds. At step 28, the PoC Client A 15 begins to send media coded with the selected codec to the originating network 14. Meanwhile, the PoC Server 13 sends a SIP INVITE request message 29 to the SIP/IP Core 12, and includes an indication of the selected codec. At step 31, the SIP/IP Core forwards the SIP INVITE request message with the indication of the selected codec to the PoC Client B 11. The PoC Client B returns a SIP 200 OK message 32, acknowledging the INVITE and the selected codec to the SIP/IP Core. At step 33, the SIP/IP Core forwards the 200 OK message to the PoC Server. At step 34, the PoC Server returns a SIP 200 OK message with an indication of the selected codec to the SIP/IP Core, which forwards the message to the originating network at step 35. At step 36, the originating network sends the media coded with the selected codec to the PoC Server, which forwards the encoded media to the PoC Client B at step 37.

Thus, the invention uses the well-known SIP protocol to publish dynamic data utilized to optimize bandwidth efficiency and audio quality. The use of SIP makes it possible to route the PUBLISH request to a PoC Server independent of the location in a well-known manner.

Figure 2:
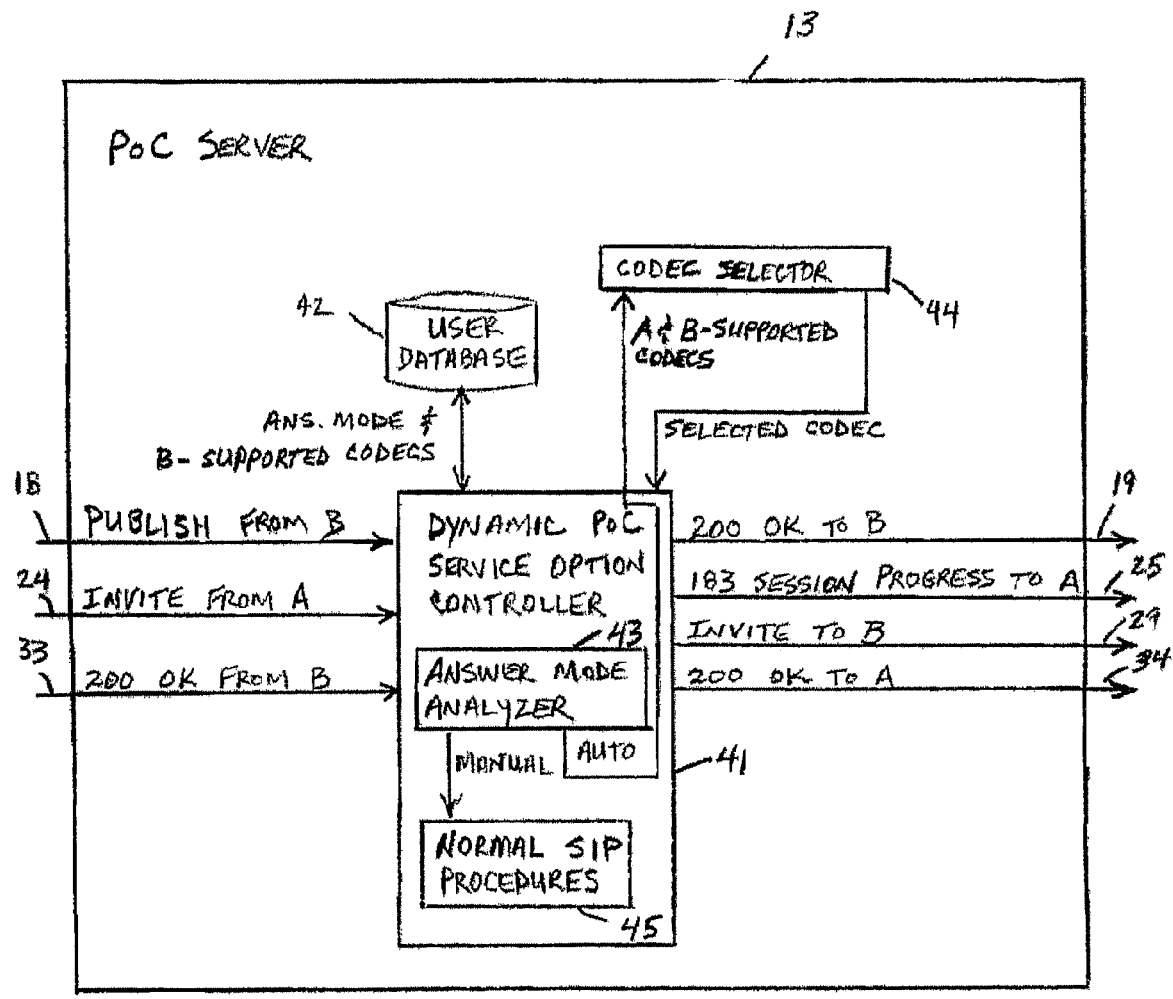
FIG. 2 is a simplified functional block diagram of a PoC Server modified in accordance with the present invention.

FIG. 2 is a simplified functional block diagram of the PoC Server 13 modified in accordance with the present invention. A dynamic PoC service option controller 41 controls signaling to and from the PoC Server according to service options that are stored in a user database 42. In the exemplary embodiment illustrated, the controller receives the PUBLISH message 18 sent by the PoC Client B 11, and stores the answering mode and the indication of the codecs supported by PoC Client B in the database. When the controller receives the INVITE message 24 sent by PoC Client A 15, the controller retrieves the data from the database and determines in an answer mode analyzer 43, whether the answering mode is manual or automatic. If the answer mode analyzer determines that the PoC Client B's answering mode is manual, the controller 41 uses normal SIP procedures 45 to establish the session.

However, if the answer mode analyzer determines that the PoC Client B's answering mode is automatic, the controller extracts the indication of the Client A-supported codecs from the INVITE message, and sends the retrieved indication of the Client B-supported codecs and the extracted indication of the Client A-supported codecs to a codec selector 44. The codec selector selects a codec that is supported by both PoC Client A and PoC Client B, and returns an indication of the selected codes to the controller. The controller then includes the indication of the selected codec in the 183 Session Progress message 25 sent toward PoC Client A and the INVITE message 29 sent toward PoC Client B. The session is then established utilizing the selected codec. It should be recognized that the answer mode analyzer 43 and the codec selector 44 may be functionally implemented as part of the dynamic PoC service option controller 41 or as separate functional units.

Those skilled in the art will readily appreciate that the present invention may be implemented using either hardware, or software, or both, and further, software implementations may vary using different languages and data structures. The present invention is not limited to a specific language and/or class of languages, nor is it limited to any single data structure implementation.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of dynamically optimizing a Push To Talk over Cellular (PoC) session, said method comprising the steps of:
    storing by a PoC server, service options of a calling PoC client and a called PoC client, wherein the PoC server receives the service options of the called PoC client in a Session Initiation Protocol (SIP) PUBLISH message sent by the called PoC client directly to the PoC server through a core network;
    retrieving by the PoC server, the stored service options during establishment of a session between the calling PoC client and the called PoC client; and
    utilizing the retrieved service options by the PoC server to optimize the session.

2. The method of claim 1, wherein the step of storing the service options by the PoC server includes storing the service options of the calling PoC client and the called PoC client in a dedicated PoC server.

3. The method of claim 1, wherein the step of storing the service options includes storing information regarding activation of a barring service that bars incoming sessions for PoC communication.

4. The method of claim 1, wherein the step of storing the service options includes storing information regarding activation of a barring service that bars incoming sessions for PoC alert.

5. The method of claim 1, wherein the step of storing the service options includes storing an indication of whether an answering mode is set to manual or automatic.

6. A method of dynamically optimizing a Push To Talk over Cellular (PoC) session, said method comprising the steps of:
    storing by a PoC server, information indicating whether an answering mode for a calling PoC client and a called PoC client is set to manual or automatic, wherein the PoC server receives the information for the called PoC client in a Session Initiation Protocol (SIP) PUBLISH message sent by the called PoC client directly to the PoC server through a core network;
    storing terminal capabilities of the calling PoC client and the called PoC client in the PoC server when the answering mode is set to automatic;
    retrieving by the PoC server, the stored answering mode information and the stored terminal capabilities during establishment of a session between the calling PoC client and the called PoC client; and
    utilizing the retrieved answering mode information and terminal capabilities by the PoC server to optimize the session.

7. The method of claim 6, wherein the step of storing terminal capabilities of the calling PoC client and the called PoC client includes storing an indication of which codecs are supported by the calling PoC client and the called PoC client.

8. A method of dynamically optimizing a Push To Talk over Cellular (PoC) session, said method comprising the steps of:
    receiving in a PoC server, a Session Initiation Protocol (SIP) PUBLISH message sent from a called PoC client directly to the PoC server through a core network, the SIP PUBLISH message including an indication of whether an answering mode of a called PoC client is set to automatic or manual, and an indication of which codecs are supported by the called PoC client for decoding encoded voice signals;
    storing the indications in the PoC server;
    receiving in the PoC server, a request from a calling PoC client to establish a session with the called PoC client, said request including an indication of which codecs are supported by the calling PoC client for encoding voice signals;
    if the answering mode of the called PoC client is set to automatic, selecting by the PoC server, a codec that is supported by both the calling PoC client and the called PoC client; and
    notifying the calling PoC client and the called PoC client of the codec selected for use during the session.

9. The method of claim 8, wherein the SIP PUBLISH message also includes an indication of whether PoC communications or PoC alerts are currently barred in the called PoC client, and the method further comprises the step of determining that PoC communications and PoC alerts are currently allowed in the called PoC client before establishing the session.

10. The method of claim 8, further comprising, if the answering mode of the called PoC client is set to manual, the step of setting up the session utilizing normal SIP procedures.

11. An apparatus in a Push To Talk over Cellular (PoC) server for dynamically optimizing a PoC session, said apparatus comprising:
    communication means for receiving a Session Initiation Protocol (SIP) PUBLISH message sent from a called PoC client directly to the PoC server through a core network, the SIP PUBLISH message including an indication of whether an answering mode of a called PoC client is set to automatic or manual, and an indication of which codecs are supported by the called PoC client for decoding encoded voice signals;
    a database for storing the indications;
    means for receiving a request message from a calling PoC client to establish a session with the called PoC client;
    a codec selector for selecting a codec that is supported by both the calling PoC client and the called PoC client;
    means responsive to receiving the request message, for retrieving from the database, the indication of the answering mode of the called PoC client, and the indication of which codecs are supported by the called PoC client, wherein if the answering mode is automatic, the indication of which codecs are supported by the called PoC client is sent to the codec selector;
    means responsive to an indication that the answering mode of the called PoC client is set to automatic, for extracting from the request message, an indication of which codecs are supported by the calling PoC client for encoding voice signals, wherein the indication of which codecs are supported by the calling PoC client is sent to the codec selector; and
    means for notifying the calling PoC client and the called PoC client of the codec selected for use during the session.

12. The apparatus of claim 11, wherein the apparatus further comprises means responsive to an indication that the answering mode of the called PoC client is set to manual, for setting up the session utilizing normal Session Initiation Protocol (SIP) procedures.

13. The method of claim 1, wherein the PoC server receives the information for the calling PoC client in a SIP INVITE message sent by the calling PoC client and forwarded to the PoC server by the core network.

14. The method of claim 8, wherein the step of receiving the request from the calling PoC client to establish the session includes receiving a SIP INVITE message sent by the calling PoC client, the SIP INVITE message including the indication of which codecs are supported by the calling PoC client for encoding voice signals.

15. The apparatus of claim 11, wherein the means for receiving a request message from a calling PoC client to establish a session is configured to receive a SIP INVITE message sent by the calling PoC client, the SIP INVITE message including the indication of which codecs are supported by the calling PoC client for encoding voice signals.

* * * * *

UNITED STATES PATENT AND TRADEMARK OFFICE
CERTIFICATE OF CORRECTION

PATENT NO. : 8,036,608 B2  Page 1 of 1
APPLICATION NO. : 11/575450
DATED : October 11, 2011
INVENTOR(S) : Holm It is certified that error appears in the above-identified patent and that said Letters Patent is hereby corrected as shown below:

On the Title Page, Item (57), under "ABSTRACT", Line 9, delete "PcC" and insert -- PoC --, therefor.

In Column 4, Line 46, delete "codes" and insert -- codec --, therefor.

Signed and Sealed this
Thirty-first Day of January, 2012

David J. Kappos
*Director of the United States Patent and Trademark Office*